(12) United States Patent
Fujikawa (10) Patent No.: US 6,284,167 B1
(45) Date of Patent: Sep. 4, 2001

(54) METHOD AND APPARATUS FOR PURGING LEAKED RESIN IN A PREPLASTICIZATION INJECTION MOLDING MACHINE

(75) Inventor: Misao Fujikawa, Ishikawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 09/207,106

(22) Filed: Dec. 8, 1998

(30) Foreign Application Priority Data

Dec. 8, 1997 (JP) .................................................. 9-356077
Oct. 15, 1998 (JP) ................................................ 10-293204

(51) Int. Cl.⁷ ............................. B29C 45/54; B29C 45/76
(52) U.S. Cl. ...................... 264/39; 264/40.1; 264/328.1; 425/135; 425/557; 425/558; 425/583
(58) Field of Search .................... 264/39, 328.1, 264/40.1, 40.4, 40.5, 40.7; 425/542, 557, 561, 583, 586, 145, 135, 225, 558

(56) References Cited

U.S. PATENT DOCUMENTS

| | | | | |
|---|---|---|---|---|
| 3,146,282 | * | 8/1964 | Ninneman | 264/39 |
| 4,280,972 | * | 7/1981 | Bishop | 264/39 |
| 4,832,883 | * | 5/1989 | Kato et al. | 264/40.1 |
| 5,248,460 | * | 9/1993 | Tsutsumi | 264/40.5 |
| 5,266,247 | * | 11/1993 | Yokota | 264/40.4 |

FOREIGN PATENT DOCUMENTS 10-664    1/1998   (JP) .

* cited by examiner

Primary Examiner—Jill L. Heitbrink
(74) Attorney, Agent, or Firm—McDermott, Will & Emery; Paul Devinsky (57) ABSTRACT

When a process measurement metering operation is performed during a molding cycle, a plunger is forcibly caused to retract to a position behind measurement metering completed position, while at the same time a periodic forced purge operation is implemented in which the plunger is immediately restored to the vicinity of the position at which the forced retraction operation commenced. By this operation, leaked resin is removed to the rear, i.e., beyond the plunger metering stroke range, and any increase in resistance to movement of the plunger due to disposition of leaked resin is avoided. The forced purge operation is preferably performed either immediately prior to the normal metering operation, or after a specified time has elapsed following completion of a metering operation.

36 Claims, 7 Drawing Sheets

METHOD AND APPARATUS FOR PURGING LEAKED RESIN IN A PREPLASTICIZATION INJECTION MOLDING MACHINE

FIELD OF THE INVENTION

The present invention relates to a method and apparatus for injection molding using a preplasticizing injection molding machine having a plasticizing device in which the molding resin material is plasticized. More particularly, the invention relates to a method and apparatus for injection molding using a preplasticization type molding machine having an injection device into which plasticized molding resin material is introduced. More particularly still, the invention relates to a method and apparatus for purging leaked resin from an injection device which injects melted resin from its injection cylinder into a metal-mold using an injection plunger.

BACKGROUND OF THE INVENTION

Injection molding machines include the in-line screw type and the preplasticizing type. The preplasticizing type of molding machine has a separate injection device and plasticizing device; the injection device being provided with an injection plunger in the injection cylinder. The preplasticizing type molding machine has a somewhat more complex structure compared to an in-line screw type molding machine, but has advantages such as more accurate metering and injection of plastic resin material, the capability of high injection pressures, as well as more accurate temperature control. Such molding machines are therefore used for injection molding of moldable resin materials in relatively severe molding conditions, such as with engineering plastics.

Figure 8:
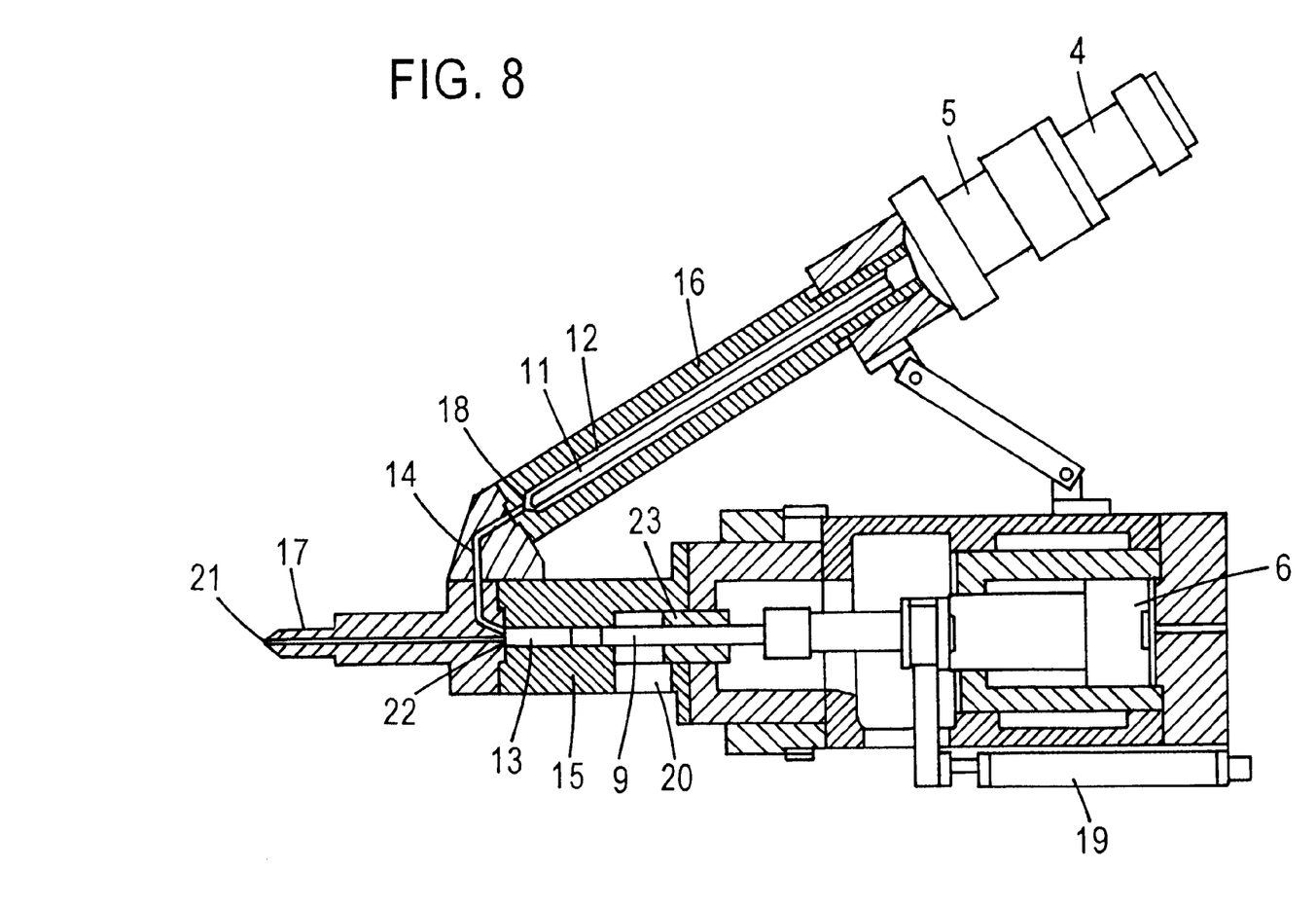
FIG. 8 is a partial section showing an example of a screw preplasticizing injection molding machine injection unit.

FIG. 8 is a partial sectional plan view illustrating an exemplary screw type preplasticizing injection molding machine. The plasticizing device includes a plasticizing chamber 12, in which the screw 11 plasticizes the plastic resin material. An injection chamber 13, from which a plunger 9 injects the molten resin material into the cavity of a metal mold (not illustrated), is provided on the screw preplasticizing injection unit. The tips of the plasticizing chamber 12 and injection chamber 13 are connected by a connection path 14. The plasticizing device also includes a plasticizing screw 11 which fits into the plasticizing chamber 12, a plasticizing motor 4 which rotationally drives the screw 11 and a shut-off hydraulic cylinder 5 which causes the screw 11 to advance over a short stroke in the axial direction so as to close the connection path 14. Although it is not shown, a hopper which supplies resin material to the base edge portion of the screw 11 is provided on the base edge side of a plasticizing cylinder 16 which forms the plasticizing chamber 12. A band heater is typically wound around the perimeter of the plasticizing cylinder 16 in order to heat the material.

The injection device further includes an injection plunger 9 which is inserted into an injection cylinder 15, which forms the injection chamber 13. A injection hydraulic piston 6 causes the plunger to advance and retract. A nozzle 17 is provided on the front of the injection chamber 13 through which molten resin is injected into a metal mold cavity (not shown).

Figure 9:
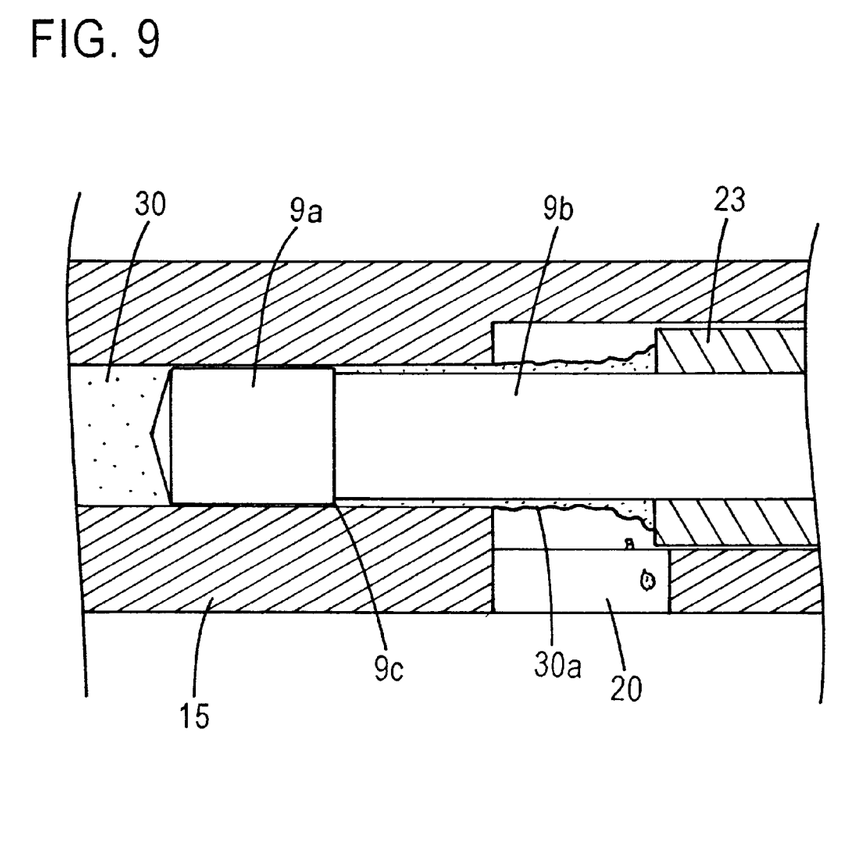
FIG. 9 is a schematic diagram showing leaked resin material film formed behind the plunger head.

As is shown in exaggerated size in FIG. 9, a step 9c, having a diameter difference of approximately 0.2 mm, is formed behind the head potion of the plunger, i.e., the piston head 9a and the plunger shaft 9b in order to ensure that when the plunger 9 moves during the injection process at high speed and with a high pressure inside the injection chamber, it will not bite into the inner wall of the injection cylinder 15. Due to the large pressure differential between the front and back of the piston head 9a which occurs during injection, molten resin 30 may pass through the gap between the piston head 9a and the injection cylinder 15 and leak out behind. In that event, leaked resin 30a collects in a thin film around the plunger shaft 9b. The leaked resin 30a is pushed back by the step 9c when the plunger 9 retracts during the metering step; it is then intercepted by a scraper 23 provided at the rear of the injection cylinder 15, which causes the leaked resin to separate from the plunger shaft 9b and fall down through a purge hole 20.

However, in preplasticizing injection molding machines in which injection is performed by means of such a plunger 9, the leaked resin 30a tends to adhere around the perimeter of the plunger shaft 9b making it difficult to purge through the purge hole 20. Because the small amount of resin material leaked behind the plunger head 9a in the injection step is intercepted by the unpurged resin film, the retraction resistance of the plunger 9 increases during subsequent normal metering steps toward the metering stroke completed position.

More particularly, when molding with engineering plastic resin materials, leaked resin 30a tends to harden and it is therefore frequently difficult to purge it through the purge hole 20. Moreover, in order to impart characteristics such as strength, heat-resistance, non-flammability, chemical resistance, etc. to this type of resin, polymer alloys, in which resins of differing physical characteristics are blended with the base resin and resin material to which a halogen base is added, are frequently used. Because the applicable temperature range at which stable melting occurs is quite narrow, the molten resin can easily degrade and its tendency to carbonize and solidify accelerates when it is being moved within the injection cylinder. Also, because some of these resin materials can solidify to high hardness, if they adhere to the plunger shaft area 9b they are not easily removed. Due to differences in molding conditions, if the time during which the leaked resin moves in the injection cylinder is extremely long, or if the temperature in the injection cylinder itself fluctuates greatly, hardening of the leaked resin will proceed, causing a phenomenon similar to that known as a "short stroke injection," in which less than 5% of the molding machine standard stroke distance is used during the metering stroke.

When the plunger retraction resistance increases, not only is there a change in the back pressure experienced during the metering operation, but also a lengthening of metering time. As a consequence, the measured resin density and temperature differ, such that the actual metered resin quantity and its viscosity differ and injected amounts change, adversely effecting the molded part quality. In the worst case, retraction of the plunger during a metering operation may become impossible, or the capability to perform plasticizing for metering is lost. Some of the unpurged resin can also become mixed into the injected molten resin.

The present applicant, in JPN Patent Notices Hei 6-91695 and Hei 6-142245 (Jpn 2,654,897), proposed a method for forcibly purging molten resin in one stroke by forcibly moving the injection plunger over its entire movement stroke in the middle of the molding cycle.

The above noted applications were for purge methods used to change new and old resin materials when changing materials (e.g., color changes) wherein the molding cycle was interrupted and the injection plunger, caused to move a full stroke during that interval. When this purge operation was performed during the molding operation, particularly when the measuring stroke was small, the molding conditions changed temporarily in mid-operation, subtly affecting the injection, plasticization, and metering operations immediately following the purge.

OBJECTS OF THE INVENTION

An object of the present invention is to provide a method and apparatus for purging leaked resin in the injection cylinder of a preplasticizing injection molding machine in which the distance moved by the injection plunger to purge leaked resin is a minimum motion distance, while at the same time, periodically performing the normal injection cycle. In other words, the purge operation is linked to the normal metering step, so that the purging operation can be carried out without interrupting the injection molding cycle, and no adverse effects will be imparted to the plasticizing, metering, or injection operations by the purge operation.

Other objects, advantages and novel features of the invention will be set forth in the description which follows, and in part will become apparent to those skilled in the art upon examination of the following or may be learned by practice of the invention. The objects and advantages of the invention may be realized and attained by means of the subject matter particularly pointed out in the appended claims.

SUMMARY OF THE INVENTION

To achieve the foregoing and other objects and in accordance with the purpose of the present invention, an injection molding machine control device, in addition to performing the metering operation during the molding cycle, also forces the plunger to retract to a position which is at or somewhat behind the metering completed position, i.e., the position at which the plunger stops when metering is complete. Preferably, the forcibly retracted plunger is then forcibly restored to a position which does not reach but is slightly behind the forced retraction start position, i.e., the position at which the forced retraction was commenced. It is not required that the forced purge operation, which includes the above forced plunger retraction operation and forced restore operation, be periodically carried out during each molding cycle; rather it may be performed periodically after a repetition of several molding cycles.

Preferably, the forced purge operation is carried out at a time immediately before entering the metering operation, or after a specified time has elapsed following completion of the metering operation. When performed after a specified elapsed time following the metering operation, it is preferable that the forced purge operation be performed before the molded part cooling period is completed.

When a suck back operation is performed immediately prior to injection, it is preferred to implement settings such that the position to which the plunger is forcibly retracted will exceed the suck back step position, and the suck back step will therefore be performed at low movement resistance. It is preferred, in this case, for the position to which the plunger is forcibly restored to approximately conform to the suck back position, so that the suck back operation can effectively be eliminated.

It is further preferred to provide a leaked resin purge control device for a preplasticizing injection molding machine equipped with a control for setting the above forced purge operation, where the control device includes a memory for storing a flag identifying whether a forced purge operation has been executed (or not), a forced purge interval (to set the interval at which the forced purge should be carried out), the number of times a forced purge operation has been stopped and a metering executed, a metering completed position, a forced retraction position to set the position which the injection plunger must reach during a forced retraction operation, and a forced restore position to set the position which the injection plunger must reach during a forced restore operation.

According to the preplasticizing injection molding machine metering method of the present invention, by accompanying the molding cycle metering operation with a periodical forced purged operation and by causing the plunger to retract further back than the normal metering completed position, resin which has leaked into the shaft perimeter region behind the piston head is pushed back to behind the range that it would have reached in the normal metering stroke, preventing the plunger from experiencing any increase in movement resistance when a normal metering operation is executed, so that metering process measurements remain stable, and molded parts of uniform quality are produced. Also, as the plunger forced restore position is preferably set to be a small restore increase value beyond the forced retraction start position, and as the forced purge operation is performed quickly and with a minimum stroke, the density, etc. of the molten resin measured during the metering step (which accompanies the forced purge operation) is essentially the same as the density, etc. of the molten resin measured during a normal metering step.

Because the forced purge operation is performed quickly, with a minimum plunger stroke and during the cooling interval of the molded part, the time used for the forced purge does not cause any delay in the molding cycle, and energy losses are kept to a minimum.

Furthermore, so long as forced retraction position is selected to be behind the position of the plunger when retracted during the suck back operation, there is no increase in resistance to movement of the plunger during the suck back operation.

Moreover, when the plunger forced retraction position is essentially the same as the suck back operation position, the suck back operation may be omitted i.e.; included in the purge operation.

BRIEF DESCRIPTION OF FIGURES

The accompanying drawings, which are incorporated in and form a part of the invention, illustrate various embodiments of the invention, and together with the description, serve to explain the principles of the invention. In the drawings.

PRESENTLY PREFERRED EMBODIMENTS OF THE INVENTION

Reference will now be made in detail to the presently preferred embodiments of the invention, examples of which are illustrated in the accompanying drawings.

Figure 1:
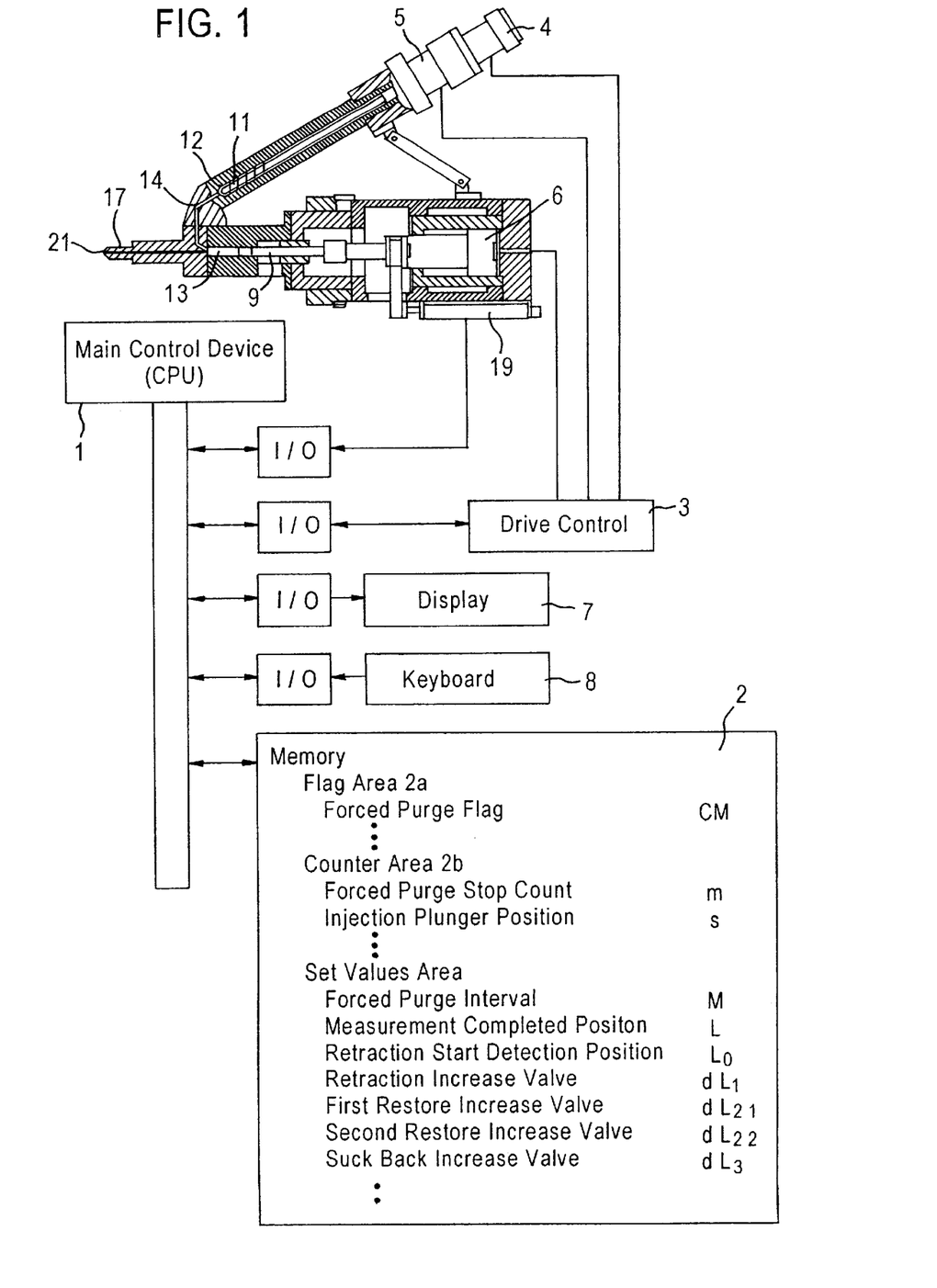
FIG. 1 illustrates an injection unit and a block diagram of its associated control device.

FIGS. 1 through 4 depict an embodiment of the invention. FIG. 1 is a diagram showing the construction of the injection unit and a block diagram of its associated control device. The injection unit is essentially the same as that previously described in connection with FIG. 8, and the similar elements are identified using the same reference numerals. In accordance with a program stored in a memory device 2 or another memory (not shown), a main control device 1, such as a programmable microprocessor, executes a forced purge operation, which includes the forced retraction operation and forced restore operation as described below as well as the normal injection cycle. The main control device 1 also controls the plasticizing motor 4, the shut-off hydraulic cylinder 5, and the injection hydraulic piston 6, all via a drive control 3, based on the values set in the memory 2. Furthermore, the main control device 1 detects the current position of the plunger 9, using a plunger position detector such as a linear scale 19. The main control device 1 is preferably a microprocessor, and the drive control 3 is preferably a hydraulic control device which includes a control circuit for controlling a hydraulic mechanism (not shown). If an electric motorized injection unit is used, the drive control 3 is preferably a motor control circuit. Also, a display 7 for displaying the operational state and settings of various values in the machine, and a keyboard 8 for inputting the values for the settings used to control the machine manually or place it in automatic operation, are connected to the main control device 1.

In the memory 2, a flag area 2a records a state-identifying flag, a counter area 2b counts cycles and measures coordinate positions, and a settings value area 2c records the values of various settings, etc which are input to the memory 2. A forced (or non-purging metering count) purge flag CM, described below, is recorded in the flag area 2a. A forced purge stop count m and a plunger current position s is recorded in counter area 2b. A forced purge interval M, a measurement completed position L, a retraction start detection position $L_0$, a retraction increase value $dL_1$, a first restore increase value $dL_{21}$, a second restore increase value $dL_{22}$, and a suck back step setting increase value $dL_3$ are respectively recorded in the settings value area 2c. As described below, the retraction start detection position $L_0$, the first restore increase value $dL_{21}$, and the second restore increase value $dL_{22}$ are used to establish the timing at which the forced purge is executed; these values need not be stored and recorded together.

The below described molding cycle is executed in a preplasticizing injection molding machine constituted as described above. A molding cycle which is the same as that done in a conventional device will first be explained, and then a metering operation, which includes a forced purge operation in accordance with an embodiment of the present invention, will be explained.

In a conventional metering process, in which plasticizing and metering of molten resin material is performed, resin material is dropped from a hopper into grooves in the screw 11 and melts due to the heat from the band heater and the compressive kneading (plasticizing) effect caused by the rotation of the screw 11. The molten resin is fed through a connecting path 14 to the injection chamber 13. At this point, a specified back pressure operates on the plunger 9, such that the resin material in the plasticizing chamber 12 is plasticized at a fixed density and temperature. As the molten material is fed out to the injection chamber 13, the plunger 9 retracts and the amount of its retraction is detected by a linear scale 19. When the plunger 9 retraction position finally reaches the metering completed position, rotation of the screw 11 stops. The screw 11 then moves forward slightly due to the shut-off hydraulic cylinder 5 to a position where the end of the screw closes off the connection path 14. The metering process step is now completed, and a fixed amount of molten resin is accumulated inside the injection chamber 13.

When the injection unit carries out the above-described metering process, cooling of the molten resin injected in the proceeding molding cycle progresses in the mold side, as does hardening of the molded part. When the metering process is completed and a specified cooling time has further elapsed, a negative pressure is created in the interior of the injection chamber 13 by a slight retraction of the plunger (i.e. the suck back step), and drooling (also known as the molten resin "runny nose" phenomenon) from the end of the nozzle 17 is stopped. Then the entire injection unit is slightly retracted and the tip of the nozzle 17 is separated from tie mold. Then the mold is opened, the molded product is ejected, and the mold is closed. Some nozzles 17 are equipped with a shut-off valve which blocks the nozzle hole 21. When such a nozzle is used, the injection molding machine prevents drooling by closing the shut off valve instead of performing a suck back operation.

Next, the injection unit is caused to advance, and the tip of the nozzle 17 to adhere tightly to the resin inlet hole in the mold. The plunger 9 is advanced and the molten resin in the injection chamber 13 is injected from the nozzle hole 21 into the cavity in the mold.

Following the injection process step, a pressure holding or packing process step is carried out. During the pressure holding or packing step, the plunger 9 is continuously pushed at a pre-set pressure. As a consequence, the remaining molten resin in the injection chamber 13 is continuously pressed toward the mold, and the resin in the mold, which has been reduced in volume due to cooling, is replenished. When the specified packing time needed for a gate seal has elapsed, the slight molten resin volume remaining between the plunger 9 and the front wall 22 (FIG. 8) of the injection chamber 13 is detected as a cushion quantity, and the measurement process for the next molding cycle begins. The above described process would be similar for an electric motor-driven injection molding machine.

In accordance with the present invention, in addition to the conventional metering operation, a forced purge operation, which includes a plunger forced retraction operation and a forced restore operation, is carried out during the molding cycle. The metering operation, which accompanies this forced purge operation, is called forced purge metering, and is distinguished from the normally performed metering operation.

Figure 2:
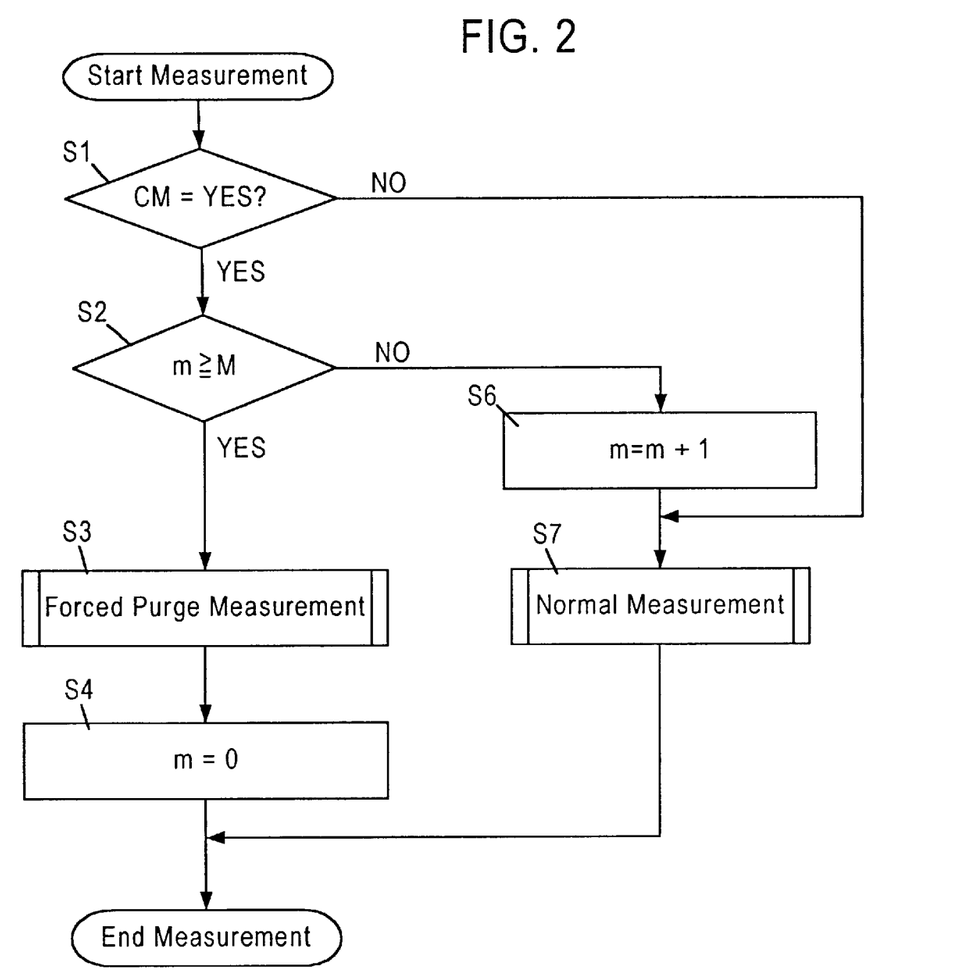
FIG. 2 is a flow chart of the metering process step accompanying the forced purge operation.

FIG. 2 is a control flow chart for the forced purge metering process of the present invention. Whether the main control device 1 performs metering accompanying a forced purge operation is predetermined by the status of the forced purge flag CM as follows. The forced purge stop count (or non-purge metering count) m, which counts the number of metering operations which do not accompany a forced purge operation, is reset to 0 when molding starts, and is updated subsequently during the molding cycle. The forced purge interval M, which sets the number of metering operations per forced purge operation, is also pre-set.

When the metering operation starts, the main control device 1 first refers to the value of the forced purge flag CM and determines (at step S1) whether to perform a forced purge operation. For example, when molding with an all-purpose resin material having good thermal stability, there is no need to perform a metering operation accompanied by the forced purge operation of the present invention, so the CM value is set to N (NO). In this case, a conventional metering operation is performed (step S7), and the metering process ends.

In contrast, when working with a resin material which is difficult to remove when it leaks out from behind the piston, the CM value is set to Y (YES) (at step S1). In this case, the main control device 1 compares the forced purge stop count m with the forced purge interval M (step S2). For a metering count where m is smaller than M, a 1 is added to the forced purge stop count m (step S6) and a normal metering operation is performed (step S7), and the metering process ends. This is because it is sufficient to only execute normal metering when the interval set for the forced purge operation has not been reached. The count M is preferably set to be relatively small when a resin material which is difficult to purge is used, and relatively large when a resin material which is easy to purge is used. In other words, the count M is preferably set consistent with the characteristics of the resin material.

The normal metering operation is repeated so long as m is smaller than M. When the number of metering processes m=M in step S2, the main control device 1 executes a metering operation which includes the forced purge operation described below, including the forced purge metering operation (step S3). Then, in order to record the fact that the forced purge metering operation has been carried out, the forced purge stop count m is reset to 0 (step S4) and the metering process ends. If the forced purge interval M is 0, usually indicating a very difficult to purge resin material is in use, forced purge metering will be carried out each for each molding cycle; if M=M1, a forced purge measurement operation will be performed after a normal metering operation is performed M1 times.

Figure 3:
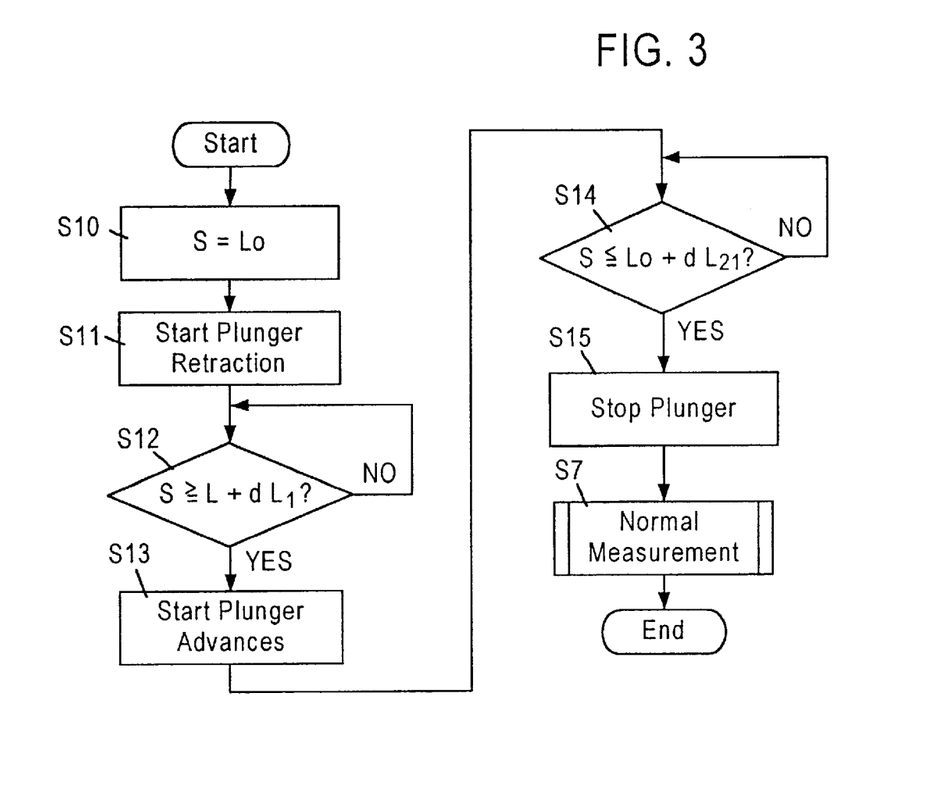
FIG. 3 is a flow chart of the forced purge operation when the forced purge operation is performed immediately before the metering operation.
Figure 5:
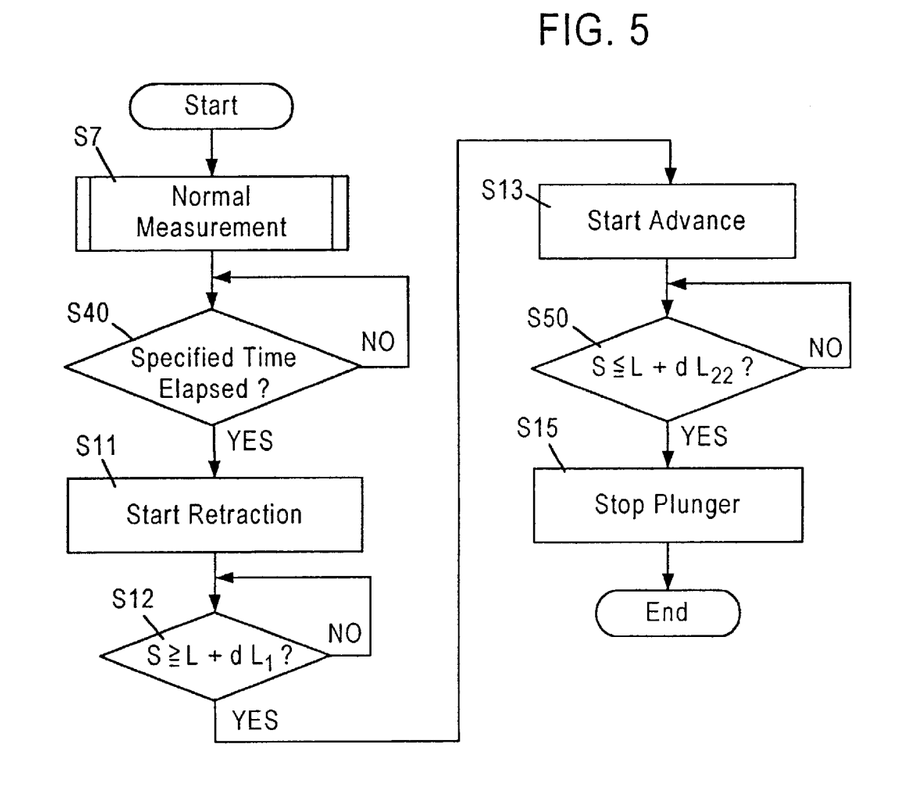
FIG. 5 is a flow chart of a forced purge operation in which the forced retraction operation is performed after a specified time lapse following completion of the measurement operation.

Referring now to the flow charts in FIGS. 3 and 5, the operation of the forced metering operation (which is accompanied by the forced purge operation) carried out in step S3 in FIG. 2 will be explained. FIG. 3 is a flow chart depicting the forced purge metering operation when the forced purge operation is performed immediately prior to a normal metering operation; FIG. 5 is a flow chart depicting the case where the forced purge operation is performed after a normal metering operation.

Figure 4:
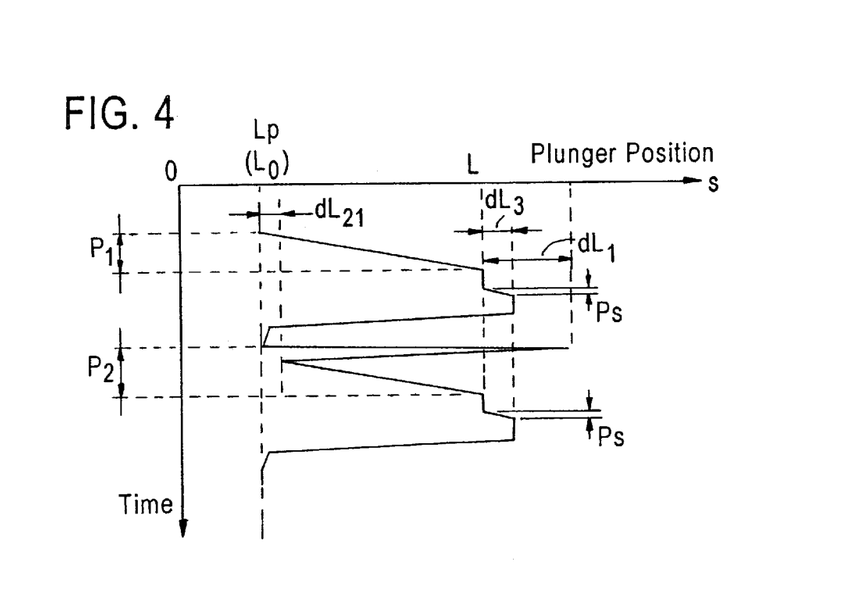
FIG. 4 is an operational line diagram depicting plunger movement when a forced purge operation is executed in which the forced retraction operation is performed immediately before the metering operation.
Figure 6:
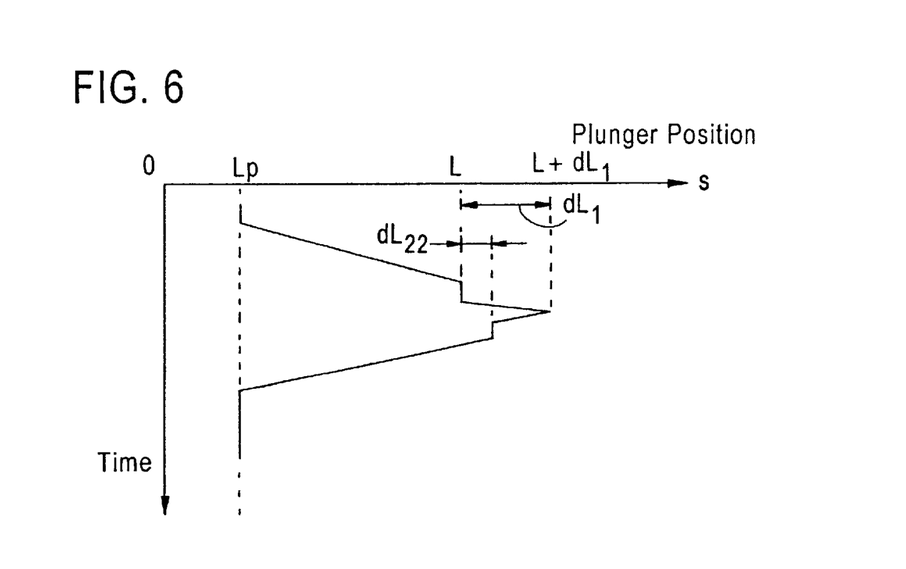
FIG. 6 is an operational diagram, depicting plunger movement when the forced purge operation performs the forced purge operation a specified time lapse following completion of the metering operation.
Figure 7:
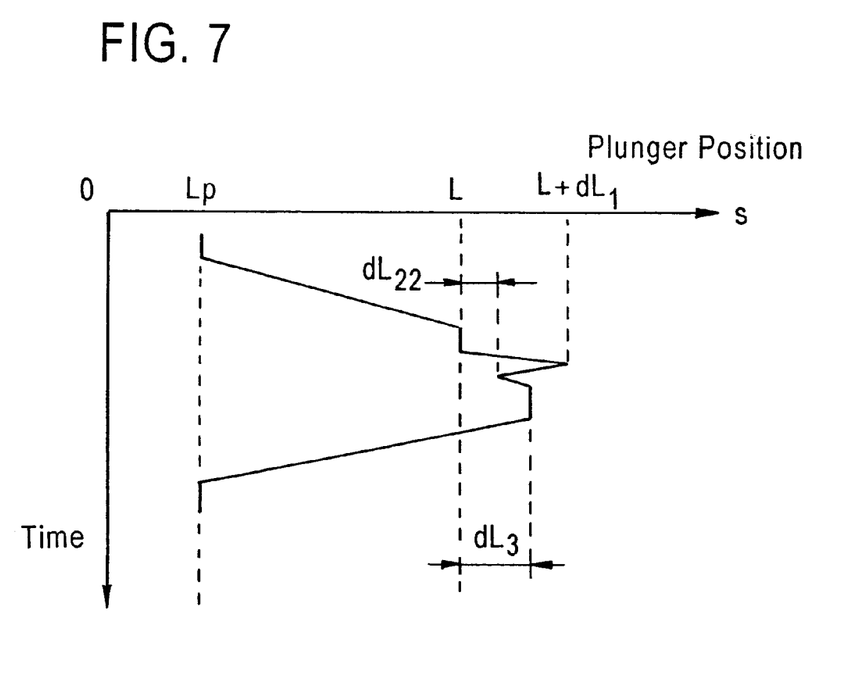
FIG. 7 is an operational diagram, depicting plunger movement when the forced purge operation performs the suck back operation with the purge operation of FIG. 6.

FIGS. 4, 6, and 7 are operational line diagrams depicting the movement of the injection plunger during a forced purge metering operation. The movement of the injection plunger for the forced purge metering operation depicted in FIG. 3 is indicated in the second injection plunger operational line diagram in FIG. 4. The same movement is shown in FIG. 6 for the case where the forced purge metering operation depicted in FIG. 5 is performed. The case in which a suck back operation is added after the forced purge metering operation is depicted in FIG. 7. In FIGS. 4, 6, and 7 the horizontal axes are the plunger positions; the position at which the plunger tip is most proximate to the front wall of the injection chamber is set as the origin (0). The vertical axes are time axes indicating an increasing passage of time from top to bottom. The example of FIG. 4 depicts the case in which the forced purge interval M set at step 2 in the FIG. 2 flow chart is 1 (i.e., a forced purge is performed on every other metering operation); the normal metering operation P1 and the forced purge metering operation P2 which accompanies the forced purge operation are normally performed alternately. The example in FIG. 6 shows the case in which the forced purge interval M is set to 0, whereby the forced purge operation is performed for every metering operation.

First, the first metering operation as depicted in FIG. 4 will be explained. This is a normal metering operation which is not accompanied by the forced purge operation and is explained here for comparison with a forced purge metering operation. The normal metering operation is completed when the plunger retracts from the position at which a cushion amount Lp was left, reaching the metering completed position (L) (segment P1). After the cooling time for the first injected molded part has elapsed, the suck back step is performed (during time segment Ps), and the plunger retracts to the (L+dL$_3$) position. Here dL$_3$ is a set value for suck back step and represents an increase in plunger position from the metering completed position L. The amount dL$_3$ is usually set at from about 2 mm, to about 3 mm. The injection unit then retracts, and the tip of the nozzle 17 is separated from the mold, following which the mold is opened, the molded part is ejected, the mold is closed etc. The next injection operation commences after the nozzle 17 has again been brought in contact with the mold. In the pressure holding or packing process step, the cushion-amount is slightly reduced until the gate seal is completed. The cushion amount Lp, the metering completed position L, and the suck back increase value dL$_3$ typically are preset molding conditions.

Next, the second metering operation shown in FIG. 4 will be explained. This operation is the forced purge metering operation in which the forced purge operation of the present invention is performed immediately prior to the start of the normal metering operation in accordance with the flowchart of FIG. 3. First, the main control device 1 detects the current plunger position, s, immediately before commencement of a forced retraction in FIG. 3 (step S10). The position "s" is recorded as the retraction start detection position (L$_o$). This position is virtually equivalent to the cushion amount (Lp), but it must be recorded as it changes slightly with each molding shot. In the next step (S11), the main control device 1 causes the injection hydraulic piston 6 to retract which causes the plunger 9 to forcibly retract at a forced retraction speed Vc. Preferably the forced retraction speed Vc is set as high as possible. In the determining step (S12), the plunger position s is compared with the set forced retraction position, i.e., the position at which the retraction increase value dL$_1$ is added to the metering completed position L during a normal metering operation. Preferably the retraction increase value dL$_1$ is set to approximately 30 mm or less. When the plunger 9 reaches the forced retraction position 6, at step S13, the plunger advances at a forced restore speed Vcr. The forced restore speed Vcr is not necessarily the same as the forced retraction speed Vc, but it is preferably set to as fast a speed as possible, i.e., to approximately the same speed as was used for the forced retraction step. At the determining step S14, a determination is made as to whether the plunger has reached the restored position, i.e. whether it has reached the forced restore position wherein the first restore increase value $dL_{21}$ is added to the retraction start detection position $L_0$ which was recorded in step S10. If the plunger 9 reaches the forced restore position, the plunger 9 stops (step S15), and a normal metering operation is carried out during the following step (step S7). The first restore increase value $dL_{21}$ is preferably stet to be a small distance, e.g., approximately 0.5 mm. After the main control device 1 has performed the forced purge operation, which quickly moves from forced retract to forced restore, a normal measurement operation is performed. Here it is desirable to set the retract increase value, $dL_1$, to be larger than the set suck back increase value $dL_3$. This is so that the plunger retraction resistance will be small during the suck back operation. During a normal suck back operation, the plunger typically moves a few mm, so the retraction increase value $dL_1$ should preferably be set to be more than that amount.

After the normal metering operation is complete, the suck back operation, which occurs during the time segment Ps in the FIG. 4, is performed after waiting for the cooling period to elapse. The next injection is preformed after the mold is opened, the molded part ejected, the mold is closed, etc. In the forced purge operation above, the forced retraction speed Vc, the increase value dL, the forced restore speed Vcr and the first restore increase value $dL_2$ are preferably preset in memory 2. These values are preferably preset taking into account the ease of degradation of the molten resin, the degree of fluidity, the quantity of decomposition gas, etc. and in accordance with the molding conditions:

Thus, any resin accumulation behind the plunger head is periodically moved by the forced purge operation to a position beyond the metering completed position, preferably beyond the suck back position, so that during normal metering operation there is no resistance in the region around the metering completed position which could impede the plunger metering operation and such back operation. Since the plunger is forcibly retracted at a high speed by a specified distance over a small stroke sufficient to surpass the metering completed position, and quickly recovers to the forced retraction start position or a position slightly behind the start position, adverse phenomena, such as the manifestation of gas in the form of air bubbles within the molten resin resident in the injection chamber in front of the plunger head 9a, or the sucking in of air from the rear of the plunger, are avoided. Also, as the forced purge operation is performed quickly, during the molded part cooling period, and with a minimum plunger movement stroke, not only is the time used for the forced purge not a cause of any delay in the molding cycle, but also energy losses are kept to a minimum.

Furthermore, even when a forced purge operation occurs immediately prior to the art of a metering, since the first restore increase value $dL_{21}$ is small, and the space between the plunger head tip 9a and the molten resin is under a vacuum, any metering performed following the forced purge operation commences under conditions identical to those of a normal metering operation, i.e., one which is not accompanied by a forced purge operation. Therefore, the forced purge operation does not influence a subsequent metering operation. While the plunger may experience increased movement resistance when it is forcibly retracted to a position behind the metering completed position, this increase in movement resistance has no adverse consequences in terms of molded part quality.

During the forced purge metering operation depicted in FIGS. 5 and 6, the forced purge operation is done after a specified time has elapsed following the completion of the metering operation. This specified time may be set to be any time between the time immediately following the completion of a metering operation and the end of molded part cooling period, but is preferably set to a time near the end of the cooling period. After first performing a normal metering operation (step S7), the main control device 1 waits for a specified time to elapse (step S40). After the specified time has elapsed, the plunger is forcibly retracted to the force retract position (steps S11 and S12). Since the plunger has already reached the metering completed position L (step S7), the forced retract stroke at this point is just the retract increase value $dL_1$ with respect to the metering completed position base. After the plunger reaches the forced retract position, the plunger is forcibly restored (steps S13 and S50), and when the plunger position reaches the position, s, at which the restore increase amount $dL_{22}$ is added to the metering completed position L, the plunger stops (step S15), and the forced purge operation is concluded. In this embodiment as well, the forced retract speed Vc, the retraction increase value $dL_1$, the forced restore speed Vcr and the second restore increase value $dL_{22}$ are preferably preset in memory 2.

Thus, as with forced purge immediately prior to a normal metering operation, a forced purge after a specified time has elapsed following completion of a metering operation presents no resistance to movement which impedes plunger retraction in the vicinity of the metering completed position during a normal metering operation. When forced purging after completion of the metering operation, a small retraction quantity $dL_1$ is sufficient for the forced purge operation stroke, and the forced purge operation is performed in an extremely short time. This effectively prevents adverse phenomena, such as the formation of air bubbles from any gas in solution within the molten resin in the injection chamber in front of the plunger head 9a, or the sucking in of air from the rear of the plunger. Thus, there is no change in the density of the molten resin after a measurement. Also, because the forced purge operation is performed with a minimum plunger movement stroke, energy losses are kept to a minimum. In cases where the specified time for the start of the forced purge is set such that the forced purge operation ends before the molded part cooling period is over, the forced purge operation is performed during the molded part cooling period, so the time used for the forced purge operation does not result in any delay in the molding cycle.

When performing a further suck back operation after the main control device 1 has caused the plunger to force purge, the suck back operation is carried out after the forced purge metering operation depicted in FIG. 5.

FIG. 7 depicts the plunger operational line diagram for the case in which the suck back operation is performed after the plunger is caused to execute a forced restore operation using the method of FIG. 6. The plunger is sucked back from the forced restore position $L+dL_{22}$. At this point, as described above, it is preferable that the retraction increase value $dL_1$ be set higher than the suck back operation increase value, $dL_3$, so that there will be no increase in the plunger movement resistance during suck back. At the same time, the setting is preferably such that the second restore increase value, $dL_{22}$, is made essentially the same as the suck back operation increase value $dL_3$. In this case, the suck back operation may even be omitted entirely.

In all of the embodiments, when the plunger forced retract position or plunger forced restore position is set by the increase value, or the restore increase value form the retraction start detect position ($L_0$), or the metering completed position L, the settings are simple and false inputs are minimized, It is possible, of course, to designate these positions using the absolute value of the distance form the origin; effectively, this is operationally the same as the present invention. When the absolute value L+dL$_1$, calculated form the retraction increase value dL$_1$, exceeds the plunger allowed stroke value, safety measures, such as sounding an alarm, etc., are preferably implemented.

The foregoing description of the preferred embodiments of the invention has been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of purging leaked resin in a preplasticizing injection molding machine having an injection device including an injection plunger having a head portion and a shaft portion, the head portion having a larger diameter than the shaft portion, said method including a metering operation and further comprising the steps of:

forcibly retracting the injection plunger to a forced retraction position which is a pre-determined position that exceeds the metering completed position;

forcibly restoring the injection plunger to a position at or slightly displaced from said metering completed position;

said forcibly retracting and forcibly restoring steps being performed periodically with respect to said metering operation;

wherein said forced retraction position is a position representing an increased retraction position from any suck back position to which the plunger may retract beyond the metering completed position.

2. The leaked resin purging method according to claim 1 wherein the period for performing said forcibly retracting and forcibly restoring steps comprises one metering operation cycle.

3. The leaked resin purging method according to claim 1 wherein the period for performing said steps of forcibly retracting and forcibly restoring comprises two or more metering operation cycles.

4. The leaked resin purging method according to claim 1 wherein said steps of forcibly retracting and forcibly restoring are performed prior to commencement of a metering operation.

5. The leaked resin purging method according to claim 1 wherein said steps of forcibly retracting and forcibly restoring are performed after completion of a metering operation.

6. The leaked resin purging method according to claim 4, wherein the steps of forcibly retracting and forcibly restoring are performed immediately prior to commencement of the metering operation, and the position of the injection plunger when the step of forcibly retracting commences is detected and recorded as the retraction start detection position (L$_0$); the position reached by the injection plunger due to the forcibly retracting step is set as a retraction increase value (dL$_1$), which is based on the metering completed position (L), and the position reached by the injection plunger during the forcibly restoring step is set as a first restore increase value (dL$_{21}$), which is based on the retraction start detection position (L$_0$).

7. The leaked resin purging method according to claim 5, wherein the steps of forcibly retracting and forcibly restoring are performed a specified time after completion of said metering operation, and the position of the injection plunger reached during the forcibly retracting step is set as the retraction increase value (dL$_1$) based on the metering completed position (L), and the injection plunger position reached when forcibly restoring is set as a second restore increase value (dL$_{22}$) based on the measurement completed position (L).

8. The leaked resin purging method according to claim 1 wherein said injection device includes an injection chamber and further comprising a suck back operation wherein a reduced pressure is created in said injection chamber, said suck back operation being performed after the said steps of forcibly retracting and forcibly restoring, wherein the position reached by the injection plunger during the step of forcibly retracting is behind the injection plunger position reached during a subsequently performed suck back operation.

9. The leaked resin purging method according to claim 1, wherein said injection device includes an injection chamber and further comprising a suck back operation wherein a reduced pressure is created in said injection chamber, said suck back operation being performed after the said steps of forcibly retracting and forcibly restoring, wherein the injection plunger position reached during the forcibly retracting step (L+dL$_1$) is behind the injection plunger position reached during a subsequent suck back operation (L+dL$_3$).

10. The leaked resin purging method according to claim 7, wherein said injection device includes an injection chamber and further comprising a suck back operation wherein a reduced pressure is created in said injection chamber, said suck back operation being performed after the said steps of forcibly retracting and forcibly restoring, wherein the injection plunger position reached during the forcibly retracting step (L+dL$_1$) is behind the injection plunger position reached during a subsequently implemented suck back operation (L+dL$_3$), while at the same time the injection plunger position reached during the forcibly retracing step (L+dL$_{22}$) is at approximately the same position reached by the injection plunger during the suck back operation (L+dL$_3$).

11. A method of injection molding using a preplasticizing injection molding machine, said preplasticizing injection molding machine having an injection unit, a preplasticizing unit, a connection path between said injection unit and preplasticizing unit, and a valving device in the connecting path for isolating the injection unit from the preplasticizing unit, and wherein the injection unit includes an injection plunger having a head portion, a shaft portion and a chamber in which said injection plunger is disposed to reciprocate, and the plunger head portion being larger in diameter than the shaft portion thereof and the injection chamber having a purge hole proximate an end thereof in which said shaft portion is disposed, said method comprising;

(a) an injection operation comprising the steps of;
(1) melting plastic resin in the preplasticizing chamber; and
(2) metering the plastic resin in said injection chamber with the molten resin introduced from the preplasticizing chamber into the injection chamber via said connection path;
(3) isolating the injection chamber from the preplasticizing chamber;

(4) injecting plastic resin as the injection plunger advances in the injection chamber, and (b) periodically purging through the purge hole any plastic resin which has leaked behind the head portion of the injection plunger, said step of periodically purging further comprising:

(1) forcibly retracting the injection plunger from a retraction start position to a predetermined position which exceeds a metering completed position of said injection plunger, without performing said melting and metering steps; and (2) forcibly restoring the injection plunger to a position at or slightly behind said forced retraction start position, without performing an injection operation.

12. The method according to claim 11, wherein said step of periodically purging is performed during each injection operation.

13. The method according to claim 11, wherein said step of periodically purging is performed at predetermined time intervals relative to the injection operations.

14. The method according to claim 11, wherein said step of periodically purging is performed prior to commencement of said metering step.

15. The method according to claim 11, wherein said steps of periodically purging is performed after completion of metering step.

16. The method according to claim 14, wherein said steps of periodically purging further comprises the steps of:

(a) forcibly retracting the injection plunger from a retraction start detected position ($L_0$), to a retraction completion position; and (b) forcibly restoring the injection plunger to a restoration completion position.

17. The method according to claim 16 further comprising the steps of detecting and measuring the retraction start detected position ($L_0$) and wherein the retraction completion position is determined by adding a retraction increase value ($dL_1$) to the metering completion position (L).

18. The method according to claim 16 wherein the restoration completion position is set by adding a first retraction increase value ($dL_{21}$) to the retraction start position ($L_0$).

19. The method according to claim 15, wherein the step of periodically purging further comprises the steps of:

(a) forcibly retracting the injection plunger to a retraction completion position; and (b) forcibly restoring the injection plunger to a restoration completion position.

20. The method according to claim 19 wherein the retraction completion position is set by adding a retraction increase value ($dL_1$) to a metering completion position (L).

21. The method according to claim 19 wherein the restoration completion position is set by adding a second retraction increase value ($dL_{22}$) to a metering completion position (L).

22. The method according to claim 11, wherein step of periodically purging further comprises the step of forcibly retracting the injection plunger to a position which exceeds a suck back position.

23. The method according to claim 19, wherein said step of periodically purging further comprises:

(a) forcibly retracting the injection plunger to a position ($L+dL_1$) which exceeds a suck back position ($L+dL_3$) set by adding a suck back increase value ($dL_3$) to a metering completion position (L); and (b) forcibly restoring the injection plunger to a position ($dL_{22}$) set by adding a second retraction increase value ($dL_{22}$) to the metering completion position (L).

24. The method according to claim 19, wherein said steps of periodically purging further comprises:

(a) forcibly retracting the injection plunger to a position ($L+dL_1$) which exceeds a suck back position ($L+dL_3$) set by adding a suck back increase value ($dL_3$) to a metering completion position (L); and (b) injecting the molten resin essentially immediately after forcibly restoring the injection plunger to a position ($L+dL_{22}$) which is set by adding a second retraction increase value ($dL_{22}$) to the metering completion position (L).

25. The method according to claim 24 wherein the forcibly restored position ($L+dL_{22}$) is approximately equal to the suck back position ($L+dL_3$).

26. A leaked resin purge control device for a preplasticizing injection molding machine having an injection device including an injection plunger disposed in an injection chamber, said injection plunger comprising a head portion and a shaft portion, said head portion having a larger diameter then the shaft portion, said control device including a leaked resin purge control comprising:

an injection plunger drive for controlling the movement of the injection plunger;

a position detector for detecting the position of the injection plunger, and a drive-control for controlling the injection plunger drive, said drive-control further comprising a main control device operable, immediately prior to the start of a metering operation, to determine the position of said injection plunger, to force purge from said injection chamber any resin behind said injection plunger head portion and adjacent said shaft portion by forcibly retracting the injection plunger to a preset position in said injection chamber beyond a metering completed position reached during said metering operation, and then forcibly restoring the injection plunger to a position at or behind a forced retraction start position at which the forced retraction commenced.

27. The resin purging control device according to claim 26 further comprising:

an input for inputting set values for machine control and automatic operation;

a display for displaying the operational state of the molding machine and of said values; and a memory associated with said main control device for recording said set values.

28. The resin purging control device according to claim 27, wherein said memory is operable to record:

(a) a flag identifying whether the forced purge operation is to be executed;

(b) a forced purge interval to set an interval at which the forced purge is to be performed;

(c) the number of times a forced purge operation is suspended and a metering is executed;

(d) the position of the injection plunger;

(e) the forced retraction position of the injection plunger to set the position to be reached by the injection plunger during a forced retraction operation and;

(f) the forced restore position of the injection plunger to set the position to be reached by the injection plunger during said forced retraction operation.

29. The resin purging control device according to claim 27, wherein said memory is operable to record:

(a) a flag identifying whether a forced purge operation is to be executed;

(b) a forced purge interval to set an interval at which the forced purge is to be performed;

(c) the number of times a forced purge operation is suspended and a metering operation is executed;

(d) the position of the injection plunger;

(e) a measurement completed position of said injection plunger;

(f) a retraction start detected position ($L_0$), at which said forced retraction commences;

(g) a retraction increase value ($dL_1$), based on the metering completed position to set the position to be reached by the injection plunger during said forced retraction operation; and (h) a first restore increase value ($dL_{21}$), based on the retraction start detection position ($L_0$), to set the position to be reached by injection plunger position during said forced restore operation.

30. A resin purging control device for a preplasticizing injection molding machine having an injection device including an injection plunger having a head portion and a shaft portion, said head portion having a larger diameter than said shaft portion, and a resin purging control device, and further comprising;

an injection plunger drive for controlling the movement of the injection plunger;

a position detector for detecting the position of the injection plunger;

and a drive-control for controlling the injection plunger drive; and said resin purging control device further comprising a main control device, operable during a specified time interval following the completion of a metering operation to determine the position of said injection plunger to execute a forced purge operation comprising forcibly retracting the injection plunger to a preset position beyond the metering completed position at which said metering operation is completed, and a forced restoring operation to forcibly restore the position of the injection plunger to a position at or behind the forced retraction start position at which forced retraction commenced.

31. The resin purging control device according to claim 30 further comprising:

an input for inputting set values for machine control and automatic operation;

a display for displaying an operational state and set values of the machine; and a memory, associated with said main control device, for recording said set values.

32. The resin purging control device according to claim 31 wherein said memory is operable to record:

(a) a flag identifying whether a forced purge operation is to be executed;

(b) a forced purge interval to set the interval at which the forced purge is to be performed;

(c) the number of times a forced purge operation is suspended and a metering operation is executed;

(d) the position of the injection plunger;

(e) a metering completed position of said injection plunger;

(f) a retraction increased value ($dL_1$), based on the metering completed position to set the position to be attained by the injection plunger during the forced retraction operation; and (g) a second restore increase value ($dL_{22}$), based on the metering completed position, to determine the position to be reached by the injection plunger during the forced restore operation.

33. An apparatus for controlling an injection molding cycle of a preplasticizing type injection molding machine, said preplasticizing injection molding machine including an injection unit having an injection chamber, a preplastisticizing unit having a preplasticizing chamber, a passage for connecting the preplasticizing chamber and the injection chamber, a valving device for closing the connecting passage, wherein said injection unit further comprises an injection plunger disposed in said injection chamber for reciprocal movement therein, said injection plunger having a head portion larger in diameter than a shaft portion thereof and said injection chamber having a purge hole at an proximate end thereof wherein the shaft portion of said injection plunger is disposed, said apparatus comprising:

an input device for inputting set values for controlling an injection operation;

a display for displaying the operational state of the molding machine and of said values; and an injection molding controller for controlling (i) a forced purging operation for purging plastic resin which may have leaked to a location in said injection chamber where said shaft portion is disposed, and (ii) an injection operation including a resin metering operation, said forced purging operation being performed prior to said metering operation; and a memory operable to record:

(a) a flag identifying whether the forced purging operation is to be performed;

(b) a forced purge interval to set an interval at which the forced purging operation is to be performed (c) a number of times the forced purging operation is suspended and the metering operation is executed;

(d) a position of the injection plunger;

(e) a forced retraction position of the injection plunger to set the retraction position of the injection plunger during a forced retraction operation and;

(f) a forced restoration position of the injection plunger to set the restore position of the injection plunger during a forced retraction operation.

34. An apparatus for controlling an injection molding cycle of a preplasticizing type injection molding machine, said preplasticizing injection molding machine including an injection unit having an injection chamber, a preplasticizing unit having a preplasticizing chamber, a passage for connecting the preplasticizing chamber and the injection chamber, a valving type and closing device for closing the connecting passage, wherein said injection unit further comprises an injection plunger disposed in said injection chamber for reciprocal movement therein, said injection plunger having a head portion larger in diameter than a shaft portion thereof and said injection chamber having a purge hole proximate an end thereof in which the shaft portion of said injection plunger is disposed, said apparatus comprising:

an input device for inputting set values for controlling an injection operation;

a display for displaying the operational state of the molding machine and of said values; and an injection molding controller for controlling (i) a forced purging operation for purging plastic resin which may have leaked to a location in said injection chamber where said shaft portion is disposed, and (ii) an injection operation including a resin metering operation, said forced purging operation being performed prior to said metering operation; and a memory operable to record:
(a) a flag identifying whether the forced purge operation is to be executed;
(b) a forced purge interval to set an interval at which the forced purging operation is to be performed;
(c) the number of times the forced purging operation is suspended and the metering step is performed;
(d) the position of the injection plunger;
(e) a metering completed position of said injection plunger;
(f) a retraction start detected position ($L_0$), at which a forced retraction commences;
(g) a retraction increase value ($dL_1$), based on the metering completed position, to set a position to be reached by the injection plunger during a forced retraction operation; and
(h) a first restore increase value ($dL_{21}$), based on the retraction start detected position ($L_0$), to set a position to be reached by the injection plunger during a forced restore operation.

35. An apparatus for controlling an injection molding operation of a preplasticizing type injection molding machine, said preplasticizing type injection molding machine having an injection unit including an injection chamber, a preplasticizing unit including a preplasticizing chamber, a path between said plasticizing chamber and the injection chamber and a valving device to selectively close said path, said injection unit further including an injection plunger disposed to reciprocate in said injection chamber, said injection plunger having a head portion larger in diameter than a shaft portion thereof, and said injection chamber including a purge hole proximate an end thereof in which the shaft portion of said injection plunger is disposed, the apparatus further comprising:

an input device for inputting set values for controlling injection cycles;

a display for displaying an operational state of the molding machine operation and of said values; and an injection molding controller for controlling (i) a forced purging operation for purging plastic resin which may have leaked to the portion of the injection chamber where said shaft portion is disposed, and (ii) an injection molding operation which includes a plastic resin metering operation, said forced purging operation being performed after completion of said metering operation; and wherein said injection molding controller includes a memory operable to record:
(a) a flag identifying whether the forced purging operation is to be performed;
(b) a forced purge interval to set an interval at which the forced purging operation is to be performed;
(c) the number of times the forced purging operation is suspended and the metering operation is performed;
(d) a position of the injection plunger;
(e) a forced retraction position of the injection plunger to set the position of the injection plunger during a forced retraction operation, and;
(f) a forced restoration position of the injection plunger to set the position of the injection plunger during a forced restore operation.

36. An apparatus for controlling an injection molding operation of a preplasticizing type injection molding machine, said preplasticizing type injection molding machine having an injection unit including an injection chamber, a preplasticizing unit including a preplasticizing chamber, a path between said plasticizing chamber and the injection chamber and a valving device to selectively close the path, said injection unit further including an injection plunger disposed to reciprocate in said injection chamber, said injection plunger having a head portion larger in diameter than a shaft portion thereof and said injection chamber including a purge hole proximate an end thereof in which said shaft portion is disposed, said apparatus further comprising:

an input device for inputting set values for controlling injection cycles;

a display for displaying an operational state of the molding machine operation and of said values; and an injection molding controller for controlling (i) a forced purging operation for purging plastic resin which may have leaked to the portion of in the injection chamber where said shaft portion is disposed, and (ii) an injection operation including a plastic resin metering operation, said forced purging operation being performed after completion of said metering operation; said controller including a memory operable to record:
(a) a flag identifying whether the forced purging operation is to be executed;
(b) a forced purge interval to set an interval at which the forced purge is to be performed;
(c) a number of times the forced purge step is suspended and the metering operation is performed;
(d) a position of the injection plunger;
(e) a metering completed position of the injection plunger;
(f) a retraction increase value ($dL_1$), based on the metering completed position, to set a position to be attained by the injection plunger during a forced retraction operation; and
(g) a second restore increase value ($dL_{22}$), based on the metering completed position (L), to set the position to be reached by the injection plunger during a forced restore operation.

* * * * *

UNITED STATES PATENT AND TRADEMARK OFFICE
CERTIFICATE OF CORRECTION

PATENT NO.    : 6,284,167 B1
DATED         : September 4, 2001
INVENTOR(S)   : Misao Fugikawa It is certified that error appears in the above-identified patent and that said Letters Patent is hereby corrected as shown below:

<u>Column 11,</u>
Lines 34 and 35, delete "displaced from said metering completed position" and insert therefore -- behind a position at which forcible retraction commences --.

Signed and Sealed this

Tenth Day of September, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.    : 6,284,167 B1
DATED         : September 4, 2001
INVENTOR(S)   : Misao Fugiwara It is certified that error appears in the above-identified patent and that said Letters Patent is hereby corrected as shown below:

Title page,
Item [75], change Inventor name "Misao Fugikawa" to -- Misao Fugiwara --.

Column 11,
Lines 34 and 35, delete "displaced from said metering completed position" and insert therefore -- behind a position at which forcible retraction commences --.

This certificate supersedes Certificate of Correction issued September 10, 2002.

Signed and Sealed this

Twelfth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,284,167 B1  Page 1 of 1
DATED : September 4, 2001
INVENTOR(S) : Misao Fujikawa It is certified that error appears in the above-identified patent and that said Letters Patent is hereby corrected as shown below:

<u>Title page,</u>
Item [75], change Inventor name "Misao Fugikawa" (as changed by Certificate of Correction issued August 12, 2003) should be reinstated.

<u>Column 11,</u>
Lines 34 and 35, delete "displaced from said metering completed position" and insert therefore -- behind a position at which forcible retraction commences --.

This certificate supersedes Certificate of Correction issued August 12, 2003.

Signed and Sealed this

Second Day of December, 2003

JAMES E. ROGAN
*Director of the United States Patent and Trademark Office*